Jan. 10, 1956
C. L. DAY ET AL
2,730,226
ARTICLE FEEDING MECHANISM
Filed June 6, 1951
2 Sheets-Sheet 1
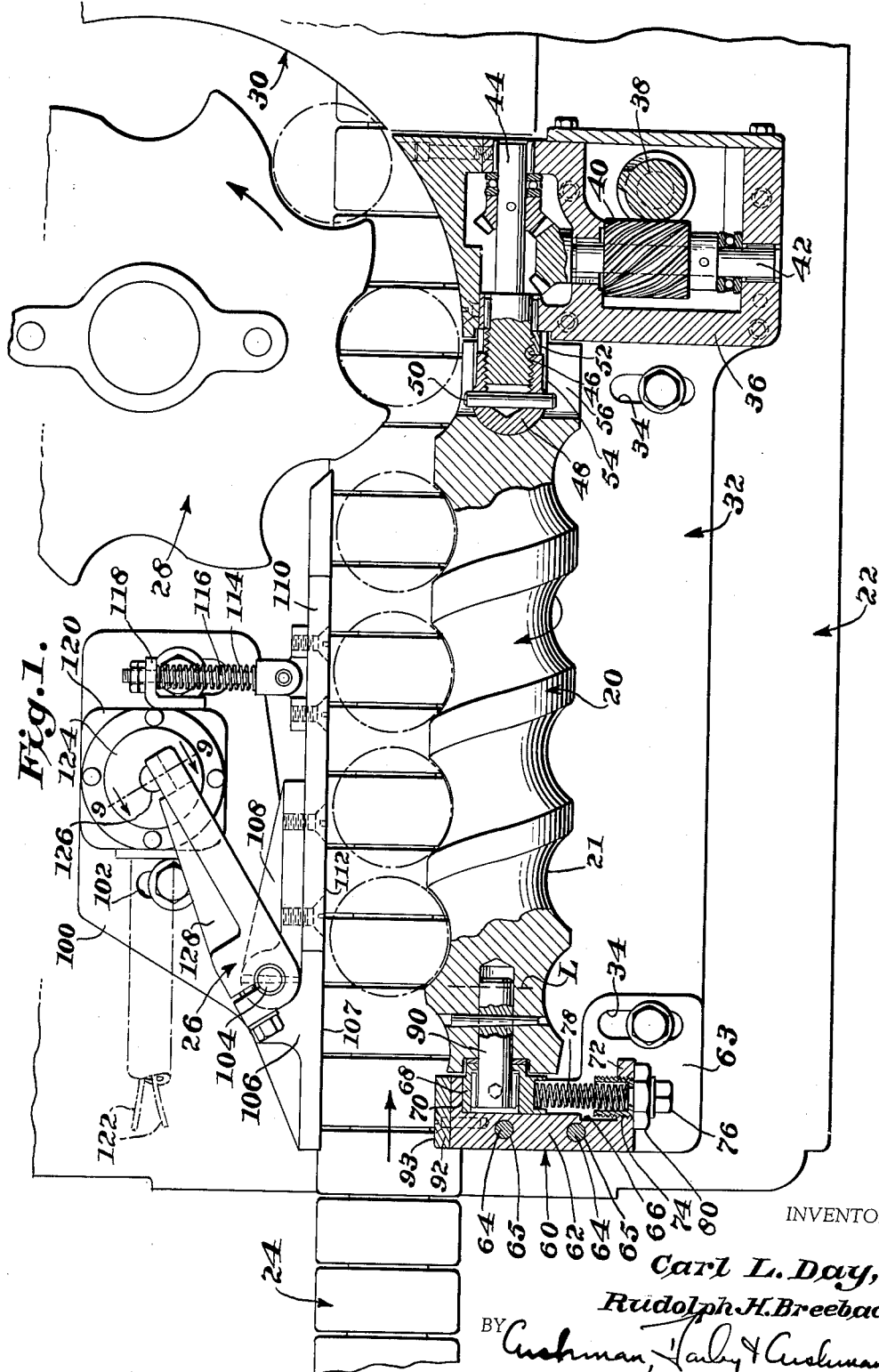
INVENTORS:
Carl L. Day,
Rudolph H. Breeback,
BY Cushman, Darby & Cushman
ATTORNEYS.

Jan. 10, 1956
C. L. DAY ET AL
2,730,226
ARTICLE FEEDING MECHANISM
Filed June 6, 1951
2 Sheets-Sheet 2
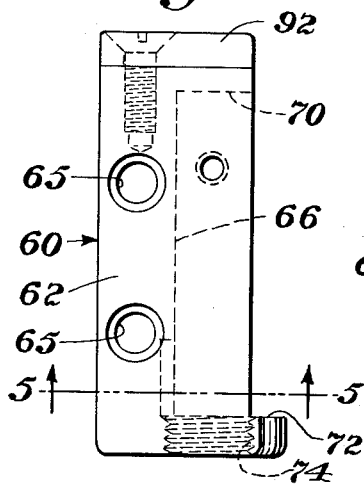
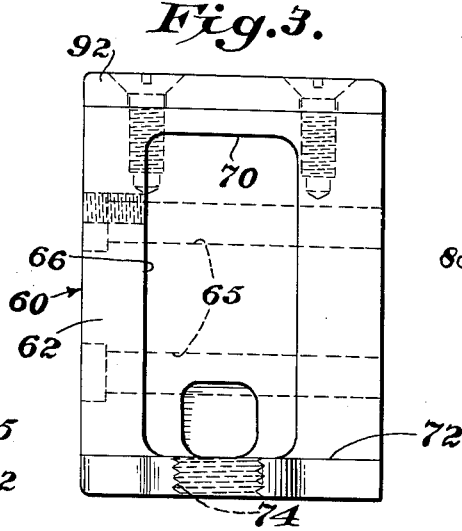
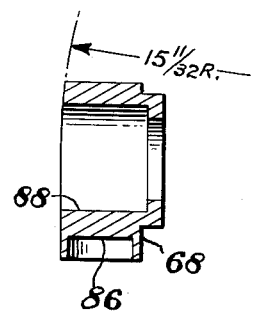
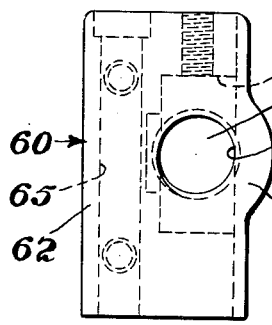
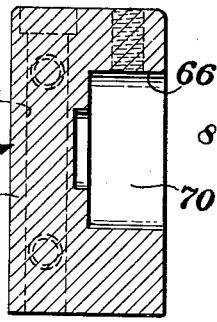
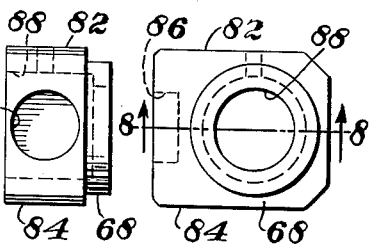
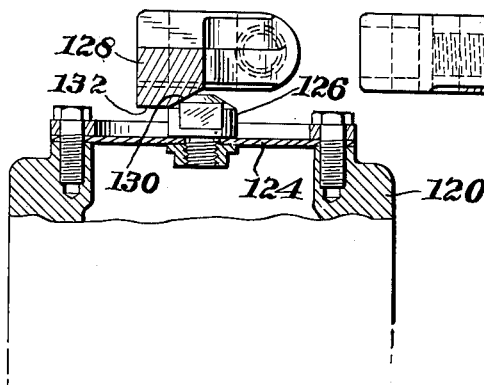
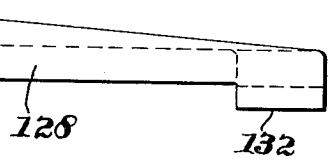
INVENTORS:
Carl L. Day,
Rudolph H. Breeback,
BY Cushman, Darby & Cushman
ATTORNEYS.

United States Patent Office 2,730,226
Patented Jan. 10, 1956

2,730,226

ARTICLE FEEDING MECHANISM

Carl L. Day and Rudolph H. Breeback, Baltimore, Md., assignors to Crown Cork & Seal Company, Inc., Baltimore, Md., a corporation of New York Application June 6, 1951, Serial No. 230,192

13 Claims. (Cl. 198—34)

The present invention relates to article feeding mechanisms and, more particularly, to mechanisms for feeding adjacent containers in spaced relation.

It frequently is desirable to feed articles at random toward machines and provide means immediately adjacent the machine to properly time the articles for movement through the machine. For example, various machines used in bottling plants have bottles or cans moved thereto along a linear path and spaced a random. However, most such machines are so designed that adjacent containers must be spaced apart a pre-determined distance during actual movement through the machine. Therefore, it is necessary to provide mechanism to position adjacent containers in properly spaced relation; that is, in timed relation with respect to the machine.

The present invention involves the provision of article feeding means of generally cylindrical form and having a helical groove therein with which the containers or other articles become engaged during their linear movement. Such arrangements usually have detector means associated therewith to stop operation of the machine in the event a container becomes jammed with respect to the grooved feeding means. For instance, containers moving toward a grooved cylindrical feeding means may not initially become properly engaged with the groove. In order to prevent a container or article from being crushed or broken in such event, a spring-urged detector usually is provided at the side of the container opposite from the feeding device. If a container becomes jammed sufficiently between the detector and the feeding device, the detector is moved outwardly against the action of its spring to actuate means to stop the machine.

The principal difficulty with the above-described arrangement is that if a container does not quickly become properly engaged with the feeding means, the detector may be actuated to stop the machine. Also, the sliding of the containers along the detector is apt to scuff or scratch them.

An object of the present invention is to provide an article feeding mechanism of such design that the jamming of containers will be minimized.

Generally speaking, the above object is achieved by having the article feeding element, viz., a helically grooved cylindrical element, so mounted that it may swing outwardly in the event that a container does not immediately become properly engaged with the groove in the element. A detector device mounted at the opposite side of the container is arranged to be operated in the event a container definitely becomes jammed.

In order that a machine of the beverage filling type can be used to handle runs of containers of different sizes, it is necessary that all container engaging devices be readily removable for quick changeover.

Another object of the invention is to provide an article feeding element of the grooved cylindrical type which readily can be removed from the machine.

Another object of the invention comprises the provision of jam detector means of optimum simplicity and whereby in the electrical equipment included therein is completely enclosed against water.

Other objects and advantages of the invention will be apparent from the following specification and accompanying drawings.

In the drawings,

Figure 1 is a plan view showing the article feeding mechanism mounted adjacent the infeed dial of a beverage filling machine. Portions of the figure are shown in horizontal section.

Figure 2 is a top plan view of the supporting or journal device which appears at the left of Figure 1.

Figure 3 is an elevation showing the device of Figure 2 as viewed from the right in Figures 1 and 2.

Figure 4 is an end view of the device of Figure 2. That is, Figure 4 shows the device as viewed from the bottom of Figure 2.

Figure 5 is a sectional view on the line 5—5 of Figure 2.

Figure 6 is a detail view of a journal member.

Figure 7 is an elevation of the journal member, the view looking toward Figure 6 from the left.

Figure 8 is a section on the line 8—8 of Figure 6.

Figure 9 is a vertical section of the jam detector included in the invention, the view being taken on the line 9—9 of Figure 1, and Figure 10 is a detail view showing the trip arm included in the jam detector.

Referring to Figure 1, the cylindrical article feeding element included in the present invention is designated by the numeral 20 and is provided with a helical groove or recess 21. As is indicated in Figure 1, if the invention is used in association with a beverage filling machine of the rotary type, element 20 will be mounted upon the table 22 of the machine and at one side of the path of movement of the usual straight line container feeding conveyor 24. The jam detector generally designated 26 will be positioned at the opposite side of conveyor 24. Containers moving through the article feeding element 20 are delivered to the usual infeed dial 28 of the filling machine and move with the latter dial within a fixed guide 30 arranged concentric with the dial.

The detailed manner of mounting the article feeding element 20 is illustrated in Figure 1. Element 20 is supported above a plate 32 which is secured to the upper surface of table 22 by means of machine screws extending through slots 34 in plate 32, the slots being so positioned that the position of plate 32 and cylinder 20 may be varied with respect to the center line of the straight line conveyor 24. At its right-hand or outfeed end, plate 32 has a housing 36 provided thereon. In accordance with prior practice illustrated in the application of Carl L. Day and Leo F. Pahl, Serial No. 126,731, filed November 12, 1949, for Mixing Apparatus and Method, the drive means for cylindrical element 20 extends into the housing 36. In more detail, a vertical shaft 38 extends upwardly through the machine table 22, shaft 38 being suitably driven in timed relation to the drive of the infeed dial 28 or whatever means received the containers or other articles from element 20. At its upper end, shaft 38 is provided with a spiral gear which meshes with another spiral gear 40 fixed to a short horizontally extending shaft 42 journalled in housing 36. At its inner end, shaft 42 carries a bevel gear which engages a bevel gear fixed to a shaft 44 arranged at right angles to shaft 42 and parallel to the path of the containers. The left-hand end of shaft 44 extends outwardly of housing 36 and is enlarged and threaded as indicated at 46. A cap 48 provided with a ball head and a cross pin 50 are mounted on the threads 46, the position of the cap being maintained by a locking collar 52.

As is clear from Figure 1, the end of cylindrical element 20 which is adjacent ball cap 48 is provided with an axial recess 54 of a sufficient size to receive the cap 48, the inner end of the recess being rounded to snugly engage the ball cap. This end of element 20 also has a diametrical slot 56 extending through the axial recess 54, the slot being of such width that the ends of pin 50 which extend from cap 48 will snugly engage the walls of the slot.

It will be observed that the ball head and pin arrangement described above comprises a universal joint drive means cooperating with the cylindrical element 20 and by means of which the latter is rotated on its axis and has angular movement with respect to shaft or pin 44.

At the infeed end of cylindrical element 20, the plate 32 has a second supporting device 60 provided thereon. The form of device 60 is illustrated in Figures 1 to 5. As appears in those figures, device 60 includes a vertically extending plate-like member portion 62 which stands upon a raised portion 63 of the large flat plate 32. Member 62 is secured to plate 32 by bolts 64 (Figure 1) which extend through non-threaded vertical bores or apertures 65 of member 62 and into aligned threaded sockets in plate 32.

As indicated in the drawings, plate member 62 has a horizontally extending recess 66 formed in the surface thereof which faces the cylindrical element 20. Recess 66 is a slideway along which a journal member 68 for element 20 is movable. The inner end 70 of slideway 66 serves as an abutment or stop limiting the movement of journal member 68 along groove 66 toward conveyor 24. The opposite or outer end of slideway 66 is closed by a wall 72 provided with a threaded aperture 74 adapted to receive a bolt or set screw 76. The inner end of set screw 76 is centrally bored to receive the outer end of a spring 78 which, as hereinafter described, extends within recess 66 to engage the journal member 68. The position of bolt 76 can be maintained by means of a locking collar 80.

The form of the journal member 68 is illustrated in Figures 1 and 6 to 8, from which it will be observed that the member is a generally box-like form to provide flat upper and lower surfaces 82 and 84 adapted to bear upon the opposed surfaces of recess 66. The rearward surface of member 68 is socketed as indicated at 86 to receive the inner end of the spring 78. Member 68 also includes a journal bore 88 adapted to receive a pin 90 fixed in the adjacent end of element 20 as hereinafter described.

In order that journal member 68 may move along recess 66 in accordance with the arcuate or swinging movement in the horizontal plane of member 20 relative to ball head 48, the forward or inner portion of member 68 is rounded as illustrated in Figure 8 on a radius concentric with ball head 48.

As is illustrated in Figure 1, the pin 90 which engages the end of the journal member 68 is fixed centrally of the element 20, preferably being secured by a drive pin.

The inner end of device 60 has a hardened plate 92 fixed thereon. The purpose of this plate is hereinafter described.

The helical groove 21 of cylindrical element 20 is of uniform depth throughout the length of element 20. That is, considering element 20 as a threaded element, its root diameter is constant. However, the pitch of the groove gradually increases from the infeed end of the element to its outfeed end to thereby cause containers to be gradually spaced apart by the action of the element. In accordance with usual practice, element 20 will be rotated at such speed that containers engaged thereby will be moved at a linear speed slightly less than the speed of travel of conveyor 24. The speed of travel of the element 20 naturally will be timed with the travel of the dial 28 and the engagement of slot 56 of element 20 with the pin 50 on shaft 44 will cause the outfeed end of the groove 21 to be properly positioned with respect to the pockets of dial 28.

Element 20 is of uniform outside or overall diameter from its outfeed end to approximately the point indicated by the dotted line L. To the left of line L, the peripheral surface of element 20 is slightly tapered so that the infeed end of the element is of a smaller diameter than the remainder of the element. The diameter of the extreme infeed end is such that no point of this end will project past the surface 93 of plate 92. The purpose of this is hereinafter described.

The jam detector device 26 is supported on a plate 100 so mounted on table 22 that its position with respect to conveyor 24 may be varied. For example, plate 100 may be provided with slots such as 102 extending transversely with respect to the direction of travel of conveyor 24 and machine screws extend through the slots into table 22.

A vertical pin 104 is journalled in a bracket 106 which extends upwardly from plate 100. Bracket 106 includes a vertical face 107 which lies opposite plate 92 and the infeed portion of element 20. Intermediate its length, pin 104 has a hinge element 108 fixed thereto and a vertically extending plate 110 is secured to lug 108 in such manner that the inner surface 112 of plate 110 normally will lie parallel to the center line of the conveyor 24 as well as parallel to the axis of feeding element 20 when the latter is in the innermost position to which it can be urged by spring 78. Thus, plate 110 serves as a means to direct and guide movement of containers with feeding element 20. Plate 110 is urged to the position described above by means of a spring 114 carried by a pin 116 pivotally connected to the rear surface of plate 110 and extending through an ear 118 secured to a housing 120 which stands upon plate 100. Plate 110 preferably is formed of vulcanized fibre or other non-metallic material to thereby avoid scratching or scuffing containers. Because containers have contact with element 20 over only a relatively small area, it may be formed of metal. However, if the articles are bottles or cans which may be wet, element 20 may be rubber-covered as disclosed in the application for Container Feed Screw of Carl L. Day and Frederick E. Fauth, Serial No. 203,514, filed December 29, 1950.

Housing 120 encloses a limit switch to which leads generally designated 122 extend. The upper end of housing 120 is closed by a resilient diaphragm 124 which as shown in Figure 9 is connected by waterproof connections to the upper end of the housing and a switch control button 126. As is shown in Figure 1, pin 104 has an arm 128 fixed to its upper end, arm 128 thus moving with pin 104 whenever the latter is rotated by movement of plate 110. As is illustrated in Figure 9, the underside of the free end of arm 128 includes a tapered surface 130 which normally is in contact with a correspondingly tapered surface of the switch operating button 126. The lower edge of the tapered surface 130 extends to a downwardly facing flat or horizontal surface 132 of arm 128. By this arrangement, when plate 110 is moved outwardly with respect to conveyor 24, that is, in a counterclockwise direction as viewed in Figure 1, pin 104 and arm 128 will be turned in the same direction. Whenever arm 128 is moved sufficiently to cause its tapered surface 132 to depress button 126 a predetermined extent, the switch within the housing 120 will be actuated to stop operation of the machine. If desired, the device may be so adjusted that the switch may not be actuated until the flat surface 132 of arm 128 reaches the central and flat uppermost surface of button 126.

The operation of the invention is as follows: Containers or other articles moving along the conveyor 24 will approach the grooved element 20 either in contact with each other or spaced at random. Suitable guide means usually will be associated with the conveyor 24 to maintain the containers in line, and containers usually will be supplied by conveyor 24 in sufficient quantity to maintain a supply of containers immediately adjacent the feeding mechanism.

Obviously, if a container happens to be positioned at the most advantageous point crosswise of conveyor 24, and also engages the infeed end of element 20 in properly timed relation with the infeed end of groove 21, the container then will continue to move toward dial 28 under control of the rotating element 20 without changing the position of either element 20 or plate 110. Because conveyor 24 will impart a slightly faster linear movement to the container than does grooved element 20, the container will tend to contact with the leading portion of groove 21 and will properly engage a pocket of dial 28.

In the event that a container approaches feeding element 20 along a line which is too close to the axis of element 20, such container will contact with the surface 93 of plate 92. Plate 92 will serve to prevent the container from engaging against the extreme end or tip of element 20. In other words, plate 92 will direct the container along a line which is somewhat further spaced from the axis of element 20.

In the event that a container reaches the infeed end of element 20 at such a moment that the container will be engaged by the peripheral surface of element 20 instead of moving into the groove 21, the continued rotation of element 20 will cause the container to be pressed between element 20 and the opposed surface 107 of the rigid bracket 106. However, the spring mounting of element 20 immediately will permit its infeed end to swing away from the conveyor 24 and the continuing tendency of the container to move with conveyor 24 thereby will cause the container to move properly into the groove 21. Hence, marring of the container will not occur and because the container will become properly engaged with groove 21 before it comes opposite detector plate 110, there will be no possibility of the detector being actuated.

It is found that the mounting of element 20 to permit its infeed end to swing away from the conveyor 24 results in proper engagement of containers by the feeding element under almost all conditions at which a standing container may approach element 20. Furthermore, no containers can be crushed or marred by improper engagement with the peripheral surface of element 20.

In the event that a container moving on conveyor 24 falls over, so that no portion of the container can enter the groove 21, the detector 26 will be actuated. In more detail, although the engagement of such a container with the infeed end of element 20 initially may be compensated for by the outward swinging of that element, nevertheless, such a container will immediately thereafter come opposite detector plate 110 to swing that plate 110 outwardly. Therefore, lever 128 will be moved outwardly to actuate the switch in housing 120 to stop operation of the machine. Plate 110 is sufficiently long that a fallen container will trip it before the container reaches dial 28.

It will be perceived from the above that plate 110 will not be moved except under unusual conditions because the resilient mounting of the infeed end of element 20 will permit that element to deflect to accommodate most "out of time" containers. It is found that this arrangement avoids a great number of the machine stoppages which heretofore have occurred in mechanisms wherein "out of time" containers deflect the plate corresponding to detector plate 110.

Whenever it becomes desirable to handle another size of containers upon the filling machine or other article handling device, the element 20 illustrated will be replaced by one of such groove size and pitch as to properly handle and space the new size of containers. This changeover is effected by removing the two bolts 64 so that the device 60 will be free of plate 32. Then the device 60 can be moved laterally and clear of the pin 90, and element 20 can be withdrawn from the cap 48 and pin 50 so that a different element 20 can be fitted in place and device 60 again fastened to table 22. It will be obvious that runs of containers of other sizes than that illustrated will necessitate changing the position of the plate 32 and the plate 100 with respect to the center line of the conveyor 24.

The terminology used in the specification is for the purpose of description and not of limitation, the scope of the invention being indicated in the following claims.

We claim:

1. A mechanism to space articles moving unidirectionally along a straight path comprising a generally cylindrical element positioned with its axis substantially parallel to and at one side of said path, said element having its periphery provided with a helical groove, a pair of supporting devices, one at each end of said element, the supporting device at the outfeed end of said element including universal joint means cooperating with said element, the supporting device at the infeed end of said element including journal means horizontally movable with respect to said path and means to urge said element toward said path, and an element at the opposite side of said path including a vertical planar face substantially parallel to the path of the articles.

2. A mechanism of the character described in claim 1 including means to rotate said cylindrical element.

3. A mechanism of the character described in claim 1 including means to rotate said cylindrical element through said universal joint means.

4. A mechanism of the character described in claim 1 wherein said cylindrical element is releasable with respect to said devices.

5. A mechanism of the character described in claim 1 wherein said cylindrical element is releasable with respect to said universal joint means.

6. A mechanism of the character described in claim 1 wherein said cylindrical element is releasable with respect to said universal joint means and said journal means.

7. A mechanism of the character described in claim 1 wherein the helical groove of said cylindrical element is of increasing pitch toward its outfeed end.

8. A mechanism of the character described in claim 1 wherein the helical groove of said cylindrical element has its root diameter constant and the periphery of said cylindrical element is of constant diameter from its outfeed end to a point adjacent its infeed end and is of decreasing diameter from said point to its infeed end.

9. A mechanism of the character described in claim 8 wherein said supporting device at the infeed end of said cylindrical element includes a rigid vertical planar surface which is at least as close to the center line of the article path as any point on the infeed end surface of said cylindrical element.

10. In combination, a table, a straight line conveyor having its upper run movable along said table to thereby move upright articles in single file at random along said table, and means to space apart the articles on said conveyor comprising a generally cylindrical element positioned with its axis substantially parallel with and at one side of said run, said element having its periphery provided with a helical groove to engage the containers, means at the outfeed end of said element to support the latter on said table for horizontal, lateral swinging movement toward and from said conveyor run, and yieldable means at the infeed end of said element to urge said element toward said conveyor.

11. The combination described in claim 10 including means to drive said element.

12. The combination described in claim 10 including a vertical plate positioned on the opposite side of the container path from said cylindrical element, means to urge the plate toward the element, and stop control means actuated by movement of the plate away from the container path.

13. The combination described in claim 12 wherein the plate is pivoted at one end for horizontal swinging movement and the stop control means includes a vertically extending tapered switch actuating button and an arm fixed with respect to said plate and including a tapered surface normally contacting with the tapered surface of said button.

References Cited in the file of this patent

UNITED STATES PATENTS

| | | |
|---|---|---|
| 2,370,969 | Kantor | Mar. 6, 1945 |
| 2,562,364 | Oates | July 31, 1951 |
| 2,571,036 | Heyne | Oct. 9, 1951 |

FOREIGN PATENTS

| | | |
|---|---|---|
| 159,533 | Germany | Dec. 29, 1905 |